(12) United States Patent
Shiel (10) Patent No.: US 10,703,007 B2
(45) Date of Patent: Jul. 7, 2020

(54) STOP MECHANISM FOR A TABLE SAW AND METHOD OF USING THE SAME

(71) Applicants: Robert Bosch Tool Corporation, Broadview, IL (US); Robert Bosch GmbH, Stuttgart (DE)

(72) Inventor: William J. Shiel, Bartlett, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/946,832

(22) Filed: Apr. 6, 2018

(65) Prior Publication Data
US 2019/0308339 A1 Oct. 10, 2019

(51) Int. Cl.
*B27B 27/10* (2006.01)
*B27B 27/02* (2006.01)
*B23D 47/02* (2006.01)

(52) U.S. Cl.
CPC ............ *B27B 27/10* (2013.01); *B23D 47/025* (2013.01); *B27B 27/02* (2013.01)

(58) Field of Classification Search
CPC ......... B23D 47/04; B27B 27/00; B27B 27/02; B27B 27/08; B27B 27/10; B27B 5/222; Y10T 83/7593; Y10T 83/76
See application file for complete search history.

(56) References Cited

U.S. PATENT DOCUMENTS

| | | | | |
|---|---|---|---|---|
| 2,560,996 A | | 7/1951 | Stone | |
| 2,747,625 A | * | 5/1956 | Small | B27B 27/04 144/253.1 |
| 2,912,019 A | * | 11/1959 | Hempe | B27G 5/02 83/763 |
| 4,693,158 A | * | 9/1987 | Price | B23Q 16/001 144/253.1 |
| 4,987,813 A | * | 1/1991 | Viazanko | B23D 47/025 144/286.1 |
| 5,337,641 A | * | 8/1994 | Duginske | B27B 25/10 144/253.1 |
| 6,240,822 B1 | | 6/2001 | Musser | |
| 6,688,202 B2 | | 2/2004 | Parks et al. | |
| 7,614,330 B2 | * | 11/2009 | Griswold | B23Q 3/007 33/706 |
| 9,682,454 B2 | | 6/2017 | Suhling | |
| 9,895,756 B2 | | 2/2018 | Fiala | |

(Continued)

*Primary Examiner* — Jennifer B Swinney
(74) *Attorney, Agent, or Firm* — Maginot, Moore & Beck LLP (57) ABSTRACT

A table saw includes at least one stop mechanism for setting or recording a position of a guide assembly on the table saw. The stop mechanism has a base member and a blocking member connected to the base member. The base member is connected to a guide structure on the table saw in an unlocked state and a locked state. In the unlocked state, the base member is infinitely adjustable relative to the guide structure along a slide axis. In the locked state, the base member is fixed relative to the guide structure. The blocking member is moveable relative to the base member between a blocking position and a bypass position. The blocking member in the blocking position is configured to contact the guide assembly and set or record a position of the guide assembly. The blocking member in the bypass position cannot contact the guide assembly.

19 Claims, 9 Drawing Sheets

(56) References Cited

U.S. PATENT DOCUMENTS

| | | | |
|---|---|---|---|
| 2001/0047706 A1* | 12/2001 | Parks | B23D 47/025 83/435.12 |
| 2002/0088327 A1* | 7/2002 | Young | B23D 45/044 83/477.1 |
| 2003/0056631 A1* | 3/2003 | Duginske | B27B 27/08 83/468.7 |
| 2005/0051012 A1* | 3/2005 | Jolkovski | B27B 27/00 83/438 |
| 2006/0248998 A1 | 11/2006 | Duginske | |
| 2015/0306784 A1* | 10/2015 | Suhling | B27B 27/10 83/438 |

* cited by examiner

STOP MECHANISM FOR A TABLE SAW AND METHOD OF USING THE SAME

FIELD

The disclosure relates generally to power tools, and more particularly to stop mechanisms that set and/or record custom positions for material guides or fences on a saw device.

BACKGROUND

Unless otherwise indicated herein, the subject matter described in this section is not prior art to the claims in this application and is not admitted to the prior art by inclusion in this section.

Many saw devices are adapted to receive fences, also known as material guides or guide assemblies, to assists users in making cuts through material. One type of fence commonly found on table saws is the rip fence. The rip fence is a table saw guide that assists users in making lengthwise cuts through material, as when cutting wood along the grain. Most rip fences traverse the table parallel to the cutting direction of the blade. In order to make cuts of varying width, a user slides the fence along the table closer to or farther away from the blade. To ensure an accurate cut is made, the fence is typically securely fastened to the table.

Figure 9:
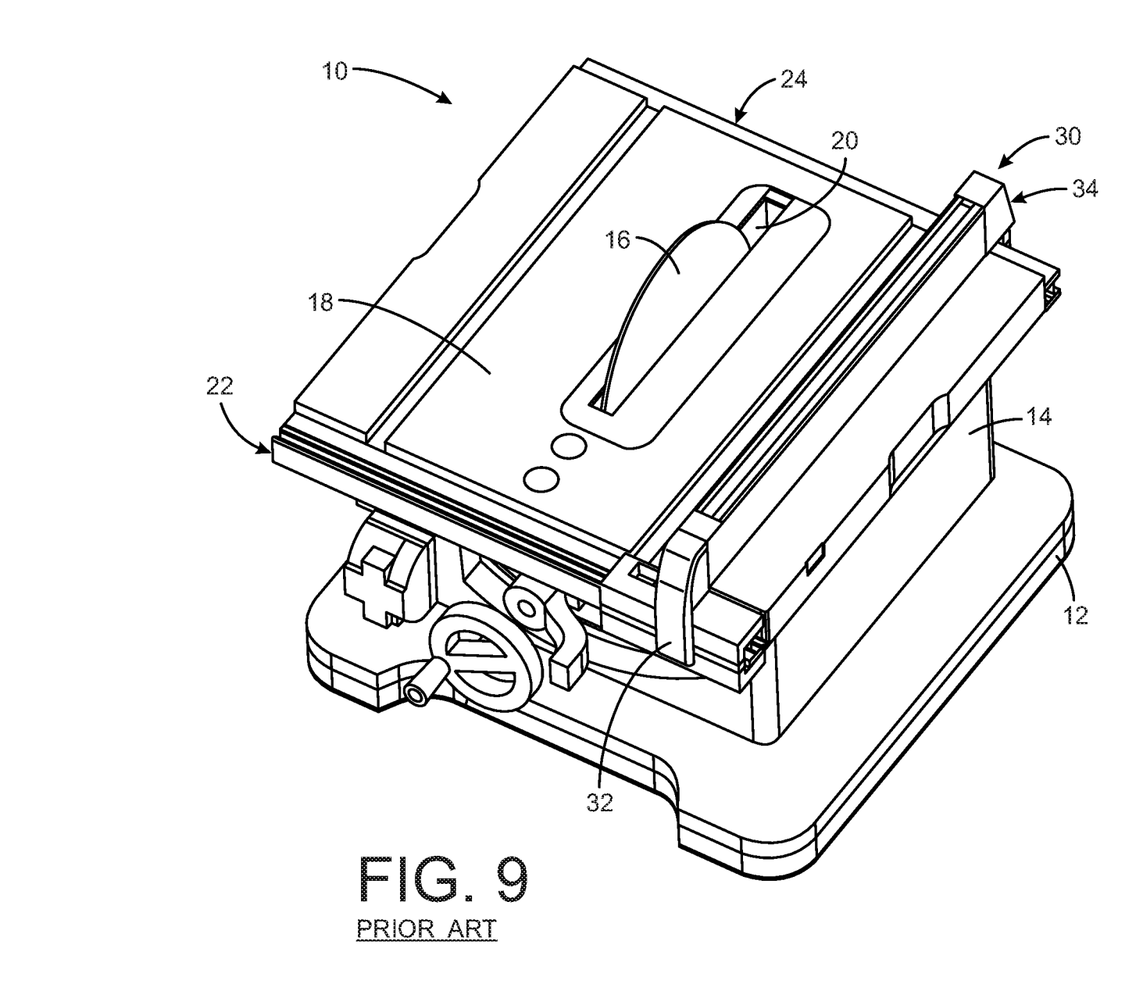
FIG. 9 is a perspective view of a known table saw and rip fence.

FIG. 9 depicts a saw device in the form of a table saw that includes a known rip fence 30. The table saw 10 includes a base 12 that supports an enclosure 14. The enclosure 14 houses an electric motor having a shaft upon which a cutting tool, usually a blade 16, is mounted for rotation. A planar surface, commonly referred to as a table 18, is secured to the top of the enclosure 14. The table 18 is usually constructed of a rigid and flat material such as metal, plastic, or fiberglass. The blade 16 projects through an opening 20 in the surface of the table 18. A guide 22 is located toward a front of the table 18 and a guide 24 is located toward a rear of the table 18.

The rip fence 30 has a clamping system with clamp mechanisms 32, 34 that are selectively moveable between a clamped position and an unclamped position. When in the clamped position, the clamp mechanisms 32, 34 engage the guides 22, 24 and fix the rip fence 30 with respect to the blade 16 and the table 18. When in the unclamped position, the clamp mechanisms 32, 34 disengage from the guides 22, 24 and permit the rip fence 30 to slide along the table surface. The guides 22, 24 are configured to permit the rip fence 30 to be easily attached to and removed from the table. The guides 22, 24 also permit the fence 30 to slide across the surface of the table 18 for positioning by a user of the table saw 10.

While the clamping systems of known rip fences can adequately secure the fence to the table, inefficiencies may arise when there is a need to repeatedly position and secure the fence to make repetitive, nonconsecutive cuts such as may occur when multiple users use the same table saw at a job site. As an illustrative example, suppose a single table saw is used by three users at a job site: User 1, User 2, and User 3. User 1 needs to perform repetitive cuts with the fence secured at a first measured position. User 2 also needs to perform repetitive cuts, but with the fence secured at a second measured position that is different than the first measured position. User 3 is performing rough ripping such that the fence can be secured at one or more approximate positions that are different than the first and second measured positions.

If User 1 cannot complete all of his or her repetitive cuts consecutively, and the fence is thereafter moved to other positions by Users 2 or 3, then User 1 must expend valuable time and effort to reset the fence to the first measured position when the table saw is available again. The same situation arises if User 2 cannot complete all of his or her repetitive cuts consecutively, and the fence is thereafter moved to other positions by Users 1 or 3. These inefficiencies are further compounded if additional users need access to the same table saw at the job site.

In view of the foregoing, it would be advantageous to provide a table saw with at least one stop mechanism configured to set and/or record a custom position of a fence on the table saw so that the fence is repeatably positionable at the custom position after being moved to other positions on the table. It would be further advantageous if the stop mechanism could be located to set and/or record the custom position of the fence, yet other users can freely move the fence along the table to any desired position without interfering with the stop mechanism. Furthermore, it would be advantageous to provide the table saw with a plurality of stop mechanisms to set and/or record a plurality of custom positions.

SUMMARY

In accordance with one embodiment of the present disclosure, a power saw includes a blade, a table including an opening configured to receive the blade, the table having a contact zone delimited by a total range of travel of a guide assembly on the table along a slide axis, a guide structure on the table, and a stop mechanism having a base member and a blocking member connected to the base member, wherein the base member is configured to be connected to the guide structure in (i) an unlocked state in which the base member is infinitely adjustably relative to the guide structure along the slide axis and (ii) a locked state in which the base member is fixed relative to the guide structure, and wherein the blocking member is moveable relative to the base member between (i) a blocking position in which a portion of the blocking member is positioned within the contact zone and (ii) a bypass position in which the blocking member is positioned outside of the contact zone.

A method in one embodiment for setting or recording a position of an accessory on a power saw with a blade, a table with an opening configured to receive the blade, and a guide structure on the table includes connecting a stop mechanism to the guide structure via a base member configured to be (i) infinitely adjustable relative to the guide structure in an unlocked state and (ii) fixed relative to the guide structure in a locked state, and adjusting a position of the stop mechanism or the guide assembly until contact occurs between a blocking member of the stop mechanism and the guide assembly, the blocking member connected to the base member and moveable between a blocking position and a bypass position, wherein the blocking member in the blocking position is configured to contact an alignment face of the guide assembly, and wherein the blocking member in the bypass position is spaced from the guide assembly for every position of the guide assembly on the table.

DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one of ordinary skill in the art to which this disclosure pertains.

FIGS. 1, 2, 4 and 5 illustrate a saw device 100 that includes a guide assembly 102 and a stop mechanism 150 according to a first embodiment. The saw device illustrated in the figures is a table saw 100, although in other embodiments the saw device may be configured as another type of cutting tool in which a guide assembly is used to position a workpiece on a surface relative to a cutting blade. The table saw 100 includes a table 104 that defines a planar surface 106 for supporting a workpiece (not shown) and has an opening 108 (FIG. 1) through which a blade (not shown) projects. The blade establishes a cutting direction 110 of the table saw 100.

Figure 1:
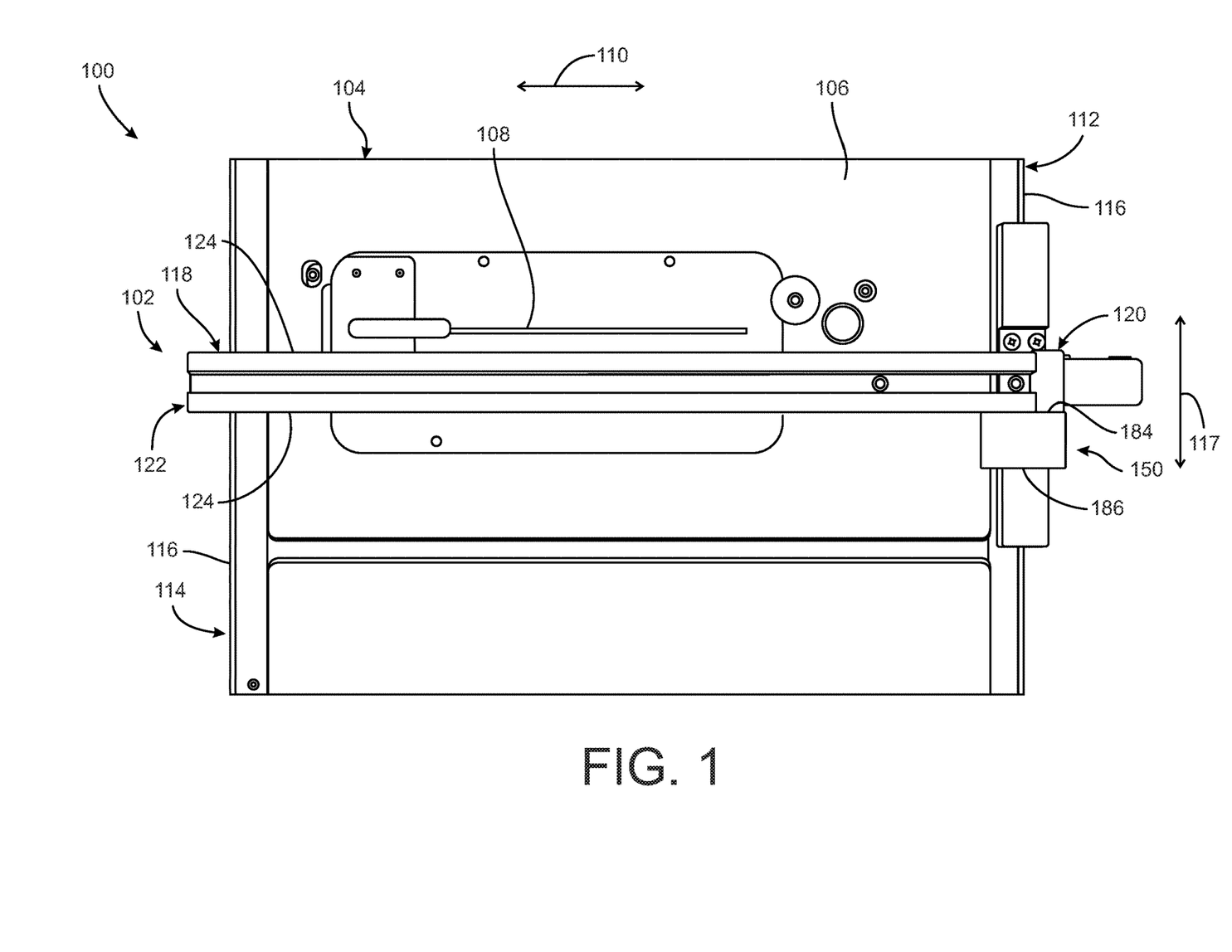
FIG. 1 is a top view of a table saw including a rip fence and a stop mechanism according to a first embodiment with the stop mechanism in a blocking position configured to set or record a position of the rip fence.
Figure 2:
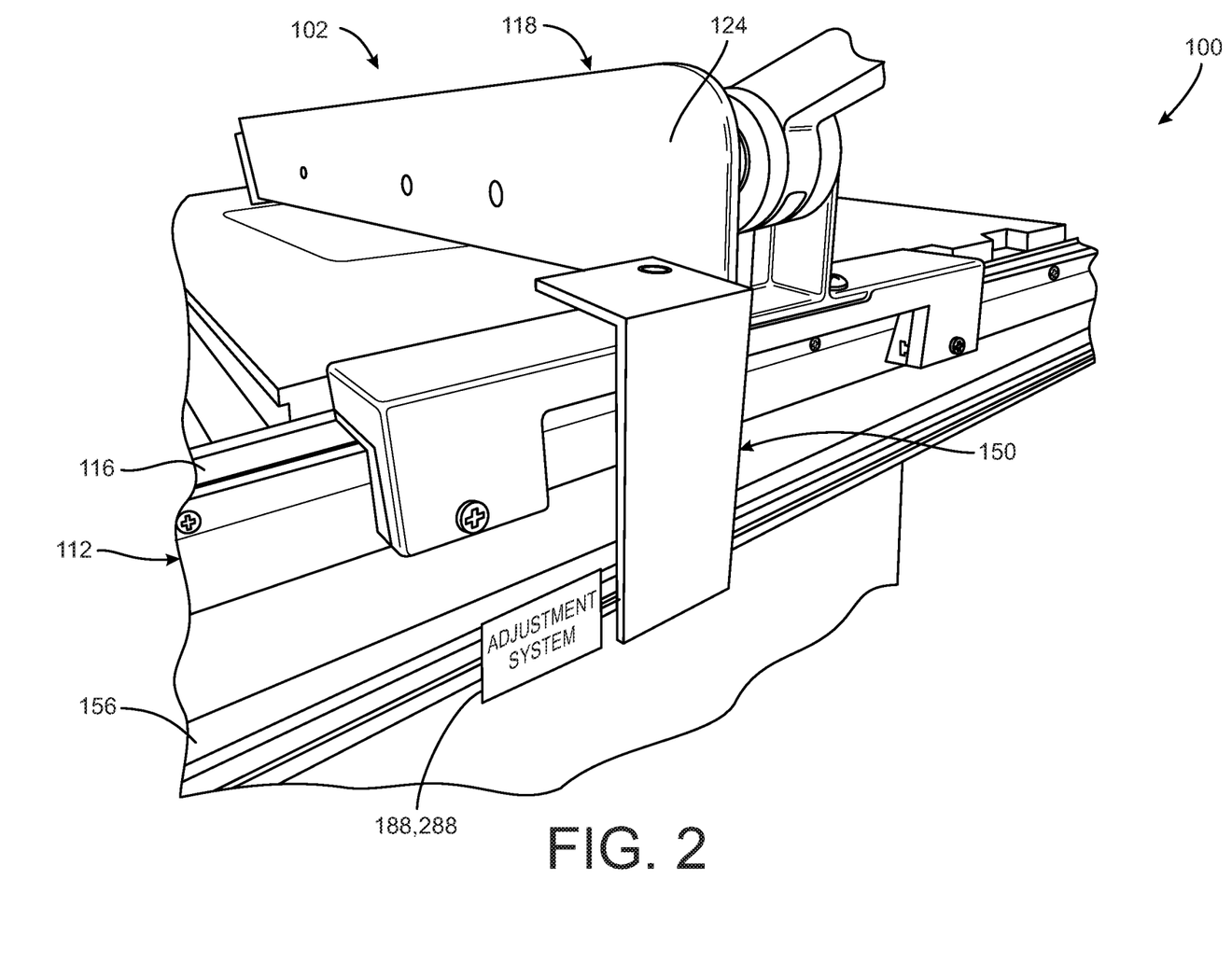
FIG. 2 is a front perspective view of the table saw with the rip fence and the stop mechanism of FIG. 1.

The table 104 has a pair of rails 112, 114 configured to support accessories of the table saw 100 such as the guide assembly 102. A first rail 112 is located toward a front of the table 104 and a second rail 114 located toward a back of the table 104. The rails 112, 114 in some embodiments are formed as part of the table 104. In other embodiments, the rails 112, 114 are separate parts each of which is coupled to the table 104 at an appropriate location. The rails 112, 114 are constructed of a rigid material such as metal or plastic.

The rails 112, 114 each include a first guide structure 116 configured to orient the guide assembly 102 relative to the blade when arranged on the table 104. The shape of the first guide structure 116 enables the guide assembly 102 to be easily attached to and removed therefrom. The shape of the first guide structure 116 also permits the guide assembly 102 to slide across the surface 106 of the table 104 for positioning by an operator or user of the table saw 100. The rails 112, 114 and the first guide structure 116 traverse the width of the table 104 and define a slide axis 117 that is substantially perpendicular to the cutting direction 110 of the blade. The guide assembly 102 is positionable relative to the blade along the slide axis 117 via cooperation with the first guide structure 116.

The guide assembly 102 can take the form of virtually any known guide assembly and is described herein only in generality. The guide assembly 102 includes an alignment member 118, a front mechanism 120 located at a first end of the alignment member 118, and a rear mechanism 122 located at a second end of the alignment member 118. The alignment member 118 is configured to guide the workpiece on the table 104 and locate the front and rear mechanisms 120, 122 relative to one another. The alignment member 118 is formed of a channel member or profile that in some embodiments defines an interior space for accommodating or positioning other elements of the guide assembly. The alignment member 118 includes alignment faces 124 each of which defines a substantially planar guiding surface for guiding the workpiece. The front and rear mechanisms 120, 122 may also have respective alignment faces. In the embodiment shown, the alignment faces of the front and rear mechanisms 120, 120 are coplanar with the alignment faces 124 of the alignment member 118 such that the guide assembly 102 has a single planar surface across an entire length of the guide assembly in a direction parallel to the cutting direction 110.

The alignment face 124 facing the blade when the guide assembly 102 is secured on the table 104 typically abuts the workpiece to be cut by the blade. When the guide assembly 102 is accurately positioned with respect to the blade, the planar guiding surface of the alignment face 124 is substantially parallel with the cutting direction 110 of the blade to provide for precise cutting of the workpiece. The guide assembly 102 can be secured to the table 104 in a similar manner as disclosed in U.S. Pat. No. 9,592,623, filed on Dec. 26, 2012, which is assigned to the same assignee as the present disclosure, and which is hereby incorporated by reference in its entirety.

Figure 3:
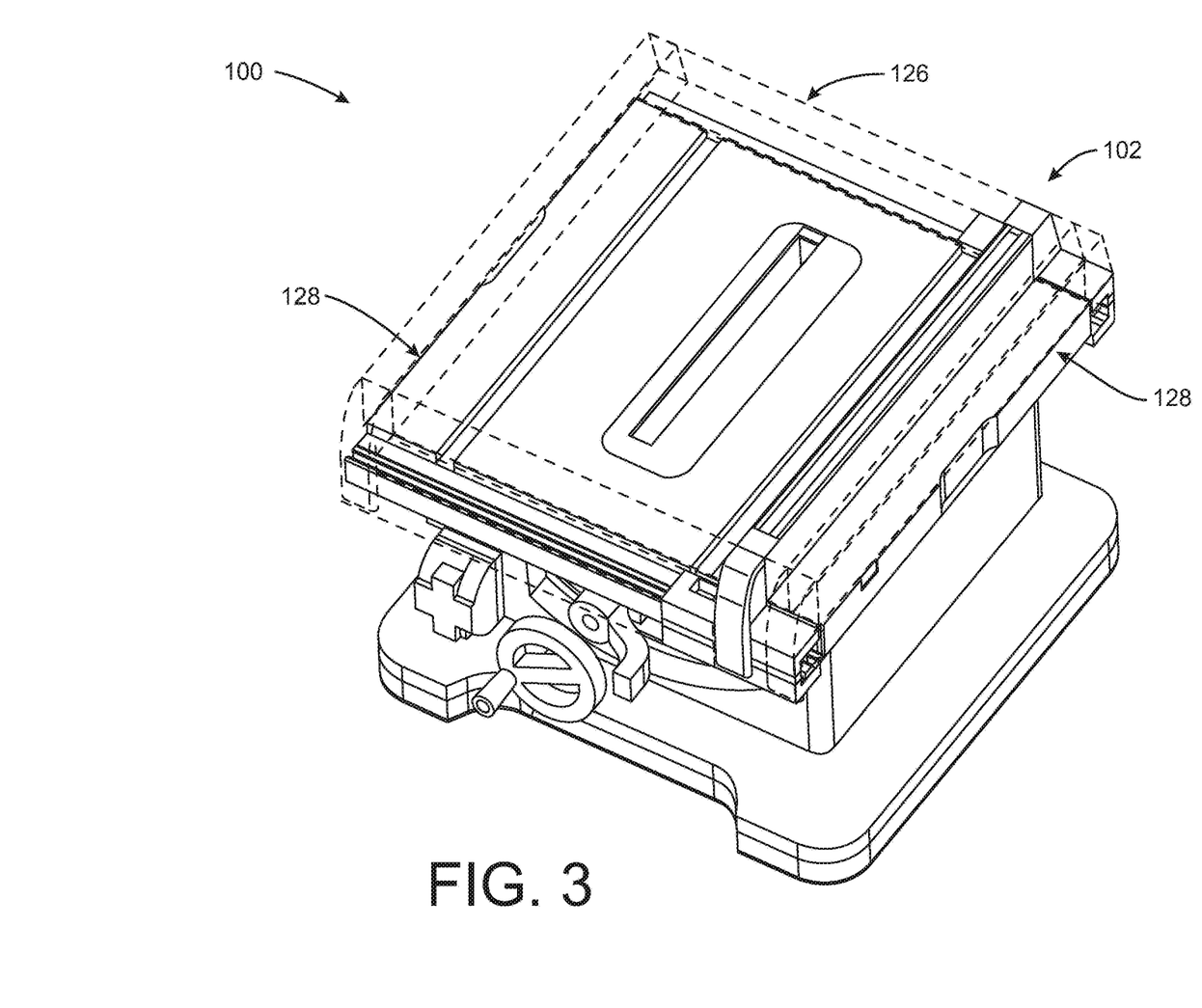
FIG. 3 is an illustration of table saw with a contact zone delimited by movement of a rip fence over a total travel range of the rip fence on the table saw.

FIG. 3 depicts the table saw 100 with a contact zone 126. As used herein, the "contact zone" of the table saw 100 is a volume of space delimited by sliding the guide assembly 102 on the rails 112, 114 over a total range of travel of the guide assembly 102 across the entire width of the table 104 while the blade is lowered beneath the surface 106. The contact zone is established by projecting an outermost periphery of the guide assembly 102 onto a reference plane oriented normal to the slide axis 117 and then sweeping that projected periphery between the ends 128 of the table 104. When the contact zone 126 is penetrated by an object, contact will result between the object and at least some portion of the guide assembly 102 when the guide assembly 102 is moved across the table 104 on the rails 112, 114. The guide assembly 102 will not contact the object when the guide assembly is moved across the table 104 if the object is disposed entirely outside of the contact zone 126.

With reference again to FIGS. 1, 2, 4, and 5, the stop mechanism 150 includes a base member 152 and a blocking member 154 operatively connected to the base member 152. The base member 152 is configured to be connected to a second guide structure 156 on the rails 112, 114 of the table saw 100. The second guide structure 156 in the embodiment shown is separately attached to the rails 112, 114 although in other embodiments the second guide structure 156 can be separately attached to the table 104 or integrally formed by the rails, the table, or both. The second guide structure 156 defines a continuous path that extends along the rail 112, 114 in a direction generally parallel to the slide axis 117 (FIG. 1). The path in some embodiments is formed as a slot or a groove in the second guide structure 156. The path in the second guide structure 156 illustrated in the figures is configured as a T-slot 158. The second guide structure 156 guides the movement of the stop mechanism 150 via the base member 152 in a direction generally parallel to the slide axis 117. The second guide structure 156 is further configured to cooperate with the base member 152 to fix a position of the stop mechanism 150 relative to the rails 112, 114.

Figure 4:
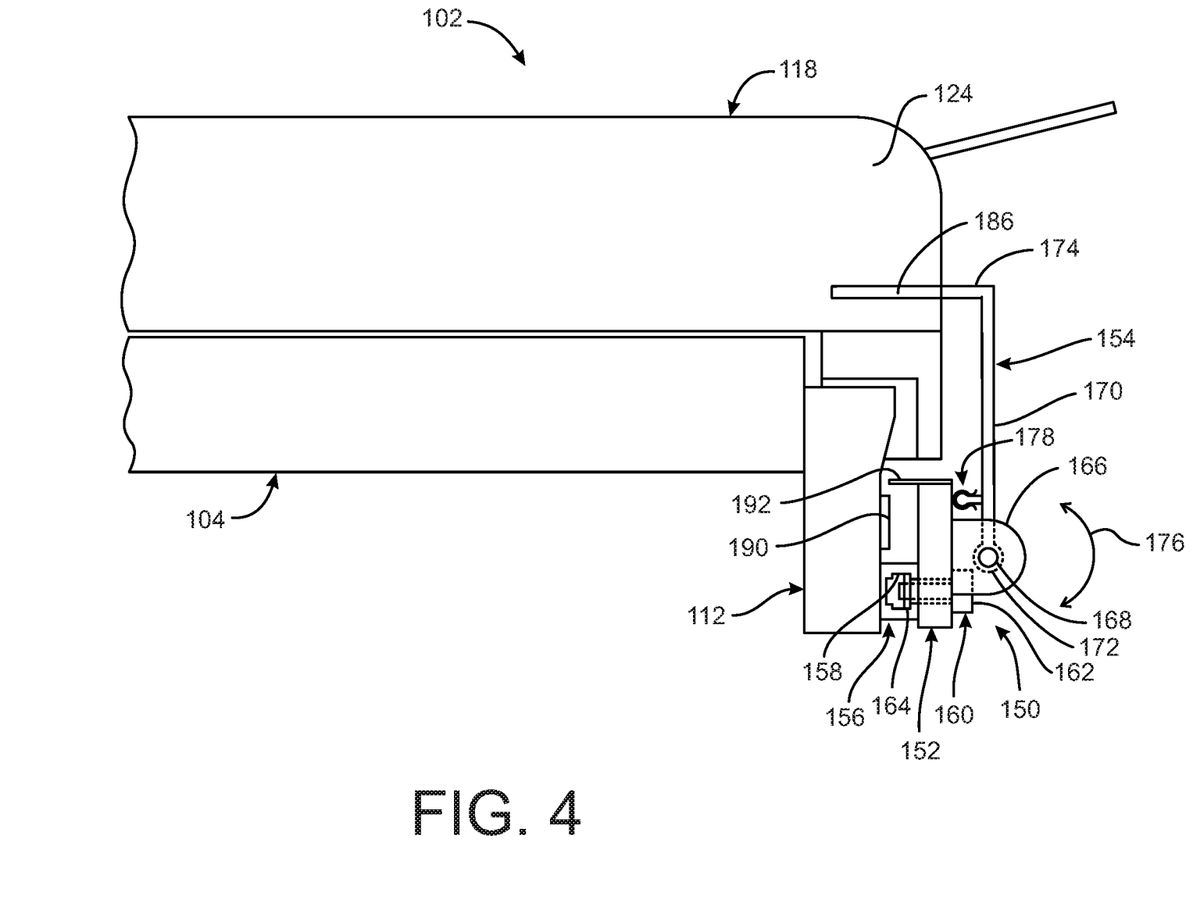
FIG. 4 is a side view of the stop mechanism of FIG. 1 in the blocking position.
Figure 5:
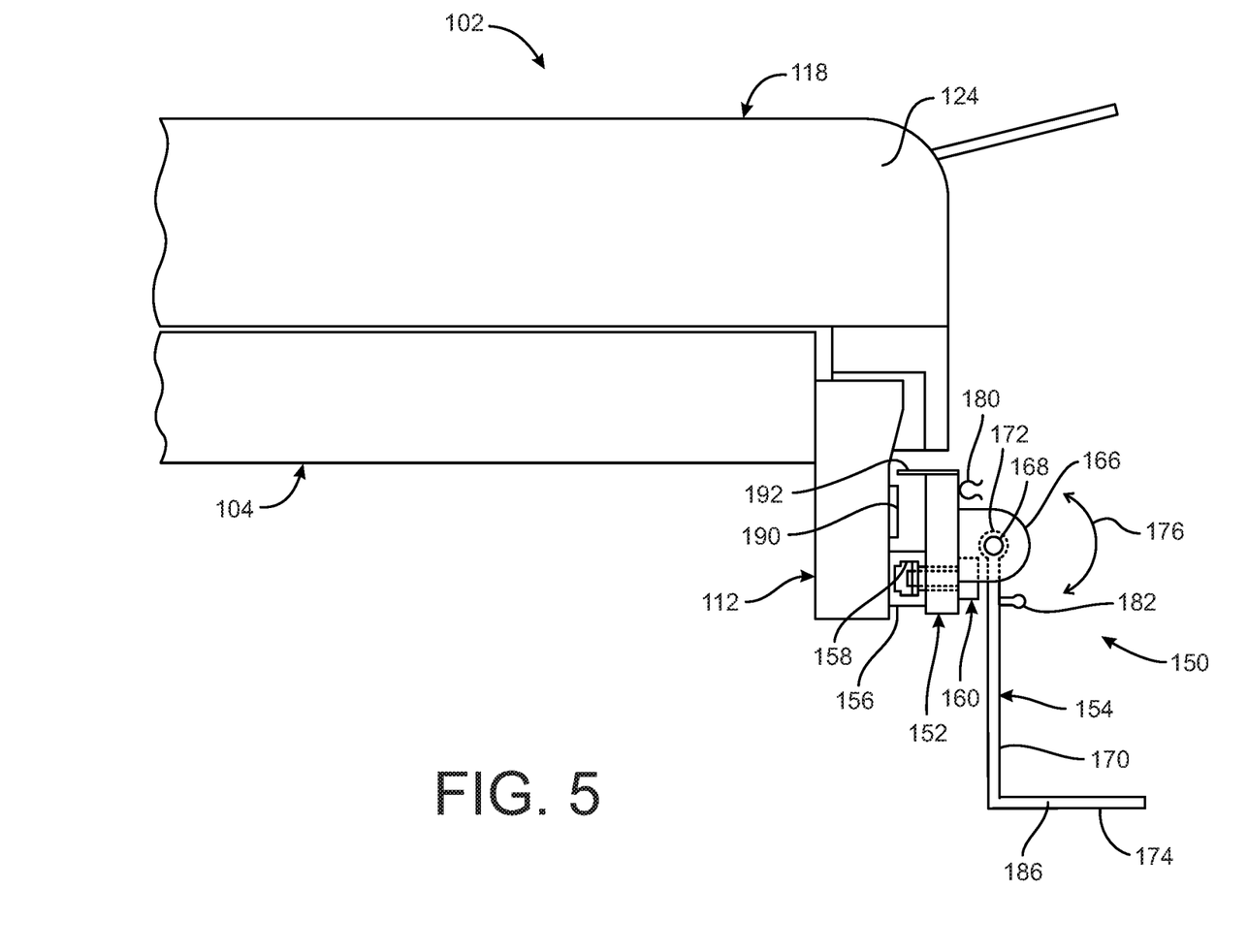
FIG. 5 is a side view of the stop mechanism of FIG. 1 in a bypass position.

The stop mechanism 150 further includes a locking member 160 that cooperates with the base member 152 and the second guide structure 156 to connect the base member 152 to the second guide structure 156. The locking member 160 is operable to change a state of the base member 152 between an unlocked state and a locked state. The base member 152 in the unlocked state is connected to the second guide structure 156 and infinitely adjustable relative to the second guide structure 156 along the slide axis 117. The base member 152 is guided along the path defined by the second guide structure 156 when moved relative to the second guide structure 156 in the unlocked state. The base member 152 in the locked state is connected to the second guide structure 156 in a fixed manner such that there is no relative motion between the base member 152 and the second guide structure 156. The base member 152 is fixed in the path defined by the second guide structure 156 when the base member 152 is in the locked state.

The locking member 160 in one embodiment includes a fastener 162 that passes through a hole in the base member 152 and engages a slot member 164 positioned within the T-slot 158. In the embodiment shown, the fastener is a screw 162 and the slot member is a nut 164 that has at least one side in contact with the T-slot 158 such that a rotation of the screw 162 does not cause a rotation of the nut 164. To place the base member 152 in the locked state, the screw 162 is rotated in a clockwise direction to draw the base member 152 into the second guide structure 156 and fix the position of the base member 152 relative to the second guide structure 156. To place the base member 152 in the unlocked state, the screw 162 is rotated in a counterclockwise direction until the base member 152 is moveable relative to the second guide structure 156. The base member 152 is removable from the table saw 100 by either entirely disengaging the screw 162 from the nut 164 or by moving the base member 152 along the slide axis 117 while in the unlocked position until the locking member 160 exits an open end of the second guide structure 156. As will be appreciated by those of ordinary skill in the art, the locking member 160 can have alternative configurations that provide the unlocking/locking functionality described herein.

The base member 152 has a first flange 166 that extends away from a surface of the base member 152 on which the fastener 162 cooperates. The first flange 166 is configured to mount a pin 168 that defines a pivot on the base member 152. The pin 168 extends in a direction parallel to the slide axis 117 and defines a rotation axis for the blocking member 154 to rotate about the pivot. In one embodiment, the base member 152 has a second flange (not shown) spaced in a parallel manner from the flange 166 along the slide axis 117. The pin 168 is mounted between the first and second flanges in this embodiment.

The blocking member 154 has a main portion 170, a connection portion 172 disposed at a first end of the main portion 170, and a blocking portion 174 disposed at a second end of the main portion 170. The connection portion 172 is configured to connect the blocking member 154 to the base member 152. In the embodiment shown, the connection portion 172 has the shape of a cylindrical body that extends parallel to the slide axis 117. The connection portion 172 defines a through hole that accepts the pin 168 of the base member 152 and permits the blocking member 154 to rotate relative to the base member 152 about the pin 168 as illustrated by arrow 176. The blocking portion 174 extends transversely from the main portion 170. In the embodiment shown, the blocking portion 174 is angled at approximately 90 degrees relative to the main portion 170 although in different embodiments the blocking portion 174 is angled at greater or lesser than 90 degrees relative to the main portion 170.

Referring now to FIGS. 4 and 5, the blocking member 154 is movable relative to the base member 152 between a blocking position (FIG. 4) in which at least a portion of the blocking portion 174 is positioned within the contact zone 126 and a bypass position (FIG. 5) in which the blocking member 154 is positioned entirely outside of the contact zone 126. The blocking member 154 is movable relative to the base member 152 regardless of the state of the base member 152 in the unlocked state or the locked state. In the blocking position depicted in FIG. 4, the transverse extension of the blocking portion 174 positions at least a portion of the blocking portion 174 within the contact zone 126 such that the alignment face 124 of the guide assembly 102 contacts the blocking portion 174 when the guide assembly 102 is moved across the table 104 on the rails 112, 114. The contact between the guide assembly 102 and the stop mechanism 150 when the blocking member 154 is in the blocking position enables the stop mechanism 150 to set and/or record the position of the guide assembly 102 on the table saw 100.

In the bypass position depicted in FIG. 5, the blocking member 154 is rotated approximately 180 degrees about the pin 168 from the blocking position depicted in FIG. 4. The bypass position positions the blocking member 154 entirely outside of the contact zone 126 such that no portion of the guide assembly 102 contacts the blocking portion 174 or any other feature of the blocking member 154 when the guide assembly 102 is moved across the table 104 on the rails 112, 114. In other embodiments, the blocking member 154 in the bypass position can have a rotation from the blocking position that is greater or lesser than 180 degrees about the pin 168 as long as the blocking member 154 is positioned entirely outside of the contact zone 126 and the stop mechanism 150 does not interfere with other functions of the table saw 100.

The stop mechanism 150 is configured such that the blocking member 154 remains in the blocking position once positioned therein until a user moves the blocking member 154 to the bypass position. The stop mechanism 150 is similarly configured such that the blocking member 154 remains in the bypass position once positioned therein until the user moves the blocking member 154 to the blocking position. In one embodiment, the center of gravity of the blocking member 154 is located such that the force of gravity acting on the blocking member 154 imparts a counterclockwise moment on the blocking member 154 (as viewed relative to FIGS. 4 and 5) to hold the blocking member 154 in the blocking position. In this embodiment, the counterclockwise moment on the blocking member 154 is counteracted by contact between the blocking member 154 and one or more of the base member 152, the rails 112, 114, and a surface of the guide assembly 102 other than the alignment faces 124 to hold the blocking member 154 in the blocking position. The stop mechanism 150 is also configured such that the blocking member 154 remains in the bypass position once positioned therein by way of the force of gravity acting on blocking member 154.

As depicted in FIGS. 4 and 5, the stop mechanism 150 in another embodiment includes a detent member 178 configured to hold the blocking member 154 in the blocking position when the blocking member 154 is positioned therein. The base member 152 in this embodiment includes a first detent portion 180 configured to engage a corresponding second detent portion 182 on the blocking member 154. The second detent portion 182 is releasable from the first detent portion 180 when the blocking member 154 is moved from the blocking position to the bypass position. The stop mechanism 150 in this embodiment also includes a first biasing member (not shown) configured to bias the blocking member 154 towards the bypass position. The first biasing member in one embodiment is a torsion spring with a first leg secured to the base member 152 and a second leg secured to the blocking member 154 to rotatably bias the blocking member 154 towards the bypass position. When the blocking member 154 is positioned in the blocking position, the engagement between the first and second detent portions 180, 182 is configured to hold the blocking member 154 in the blocking position against the bias of the first biasing member. The detent member 178 is configured to release the blocking member 154 from the blocking position upon application of a predetermined releasing force on the blocking member 154.

The blocking member 154 defines a first planar reference surface 184 (FIG. 1) and a second planar reference surface 186 spaced from and parallel to the first reference surface 184. The width of the blocking member 154 along the slide axis 117 sets the spacing between the first and second reference surfaces 184, 186. The first and second reference surfaces 184, 186 are oriented with a high-degree of accuracy to be normal to the slide axis 117 of the guide assembly 102 since contact between a corresponding alignment face 124 of the guide assembly 102 and one of the first and second reference surfaces 184, 186 sets or records the position of the guide assembly 102 on the table saw 100.

In some embodiments, the orientation of the first and second reference surfaces 184, 186 relative to the slide axis 117 is ensured by way substantially reducing the clearances between the moving components of the stop mechanism 150. For instance, the design clearance between the pin 168 of the base member 152 and the connection portion 172 of the blocking member 154 can be reduced to prevent unintended movement of the blocking member 154 relative to the base member 152 when the blocking member 154 contacts the guide assembly 102. In other embodiments, the stop mechanism 150 can include a second biasing member (not shown) that applies an axial biasing force on the blocking member 154 to push the blocking member 154 relative to the pin 168 against the flange 166 of the base member 152. In these embodiments, the second biasing member applies the axial biasing force on the blocking member 154 in a direction that eliminates any clearance between the base member 152 and the blocking member 154 when the blocking member 152 contacts the guide assembly 102.

The stop mechanism 150 in some embodiments further includes an adjustment system 188 (FIG. 2) configured to finely adjust a position of the stop mechanism 150 relative to the second guide structure 156. The adjustment system 188 is depicted as a labeled representation since the adjustment system 188 can take many forms. In embodiments of the table saw 100 that include a stop mechanism 150 with an adjustment system 188, the rail 112, 114 of the table 104 can include a measurement scale 190 (FIGS. 4 and 5) disposed proximate to the guide structure 116 in a region of the rail 112, 114 that is easily viewable by the user. The stop mechanism 150 can also include an indicator 192 (FIGS. 4 and 5) that relates a feature of the stop mechanism 150 to the measurement scale 190. The position of the indicator 192 in some embodiments corresponds to the position of one or both of the first and second reference surfaces 184, 186 of the blocking member 154. The ability to finely position the stop mechanism 150 along the measurement scale enables the user to predetermine the exact position of the guide assembly 102 before the guide assembly 102 is moved into position. The measurement scale 190 and the indicator 192 can be provided even when the adjustment system 188 is not provided with the stop mechanism 150.

The adjustment system 188 in some embodiments is internal to the stop mechanism 150. Some examples of internal-type adjustment systems include a screw type system or a friction wheel system. A screw system functions with a screw axis parallel to the slide axis. The adjustment screw connects and through rotation alters the position along the slide axis of the blocking member relative to the base member. Alternatively, the screw is positioned as part of the blocking member in which the screw adjusts the contact position of the blocking member to the guide assembly relative to the base member. A friction wheel system incorporates a wheel with an axis perpendicular to the slide axis and a frictional tangential contact to a fixed member along the slide axis. When the friction wheel is rotated, the friction between its tangential surface and the fixed member causes travel of the base member along the slide axis. The friction wheel mechanism allows for a rotary input resulting in linear slide axis travel.

In other embodiments, the adjustment system 188 is external to the stop mechanism 150 and involves a connection between the stop mechanism 150 and the rail 112, 114. Some examples of external-type adjustment systems include a rack and pinion system, a belt and wheel system, a cam-action adjuster, and a threaded rod and nut system. A rack and pinion system functions similar to a friction wheel mechanism described above. A gear tooth rack or equivalent is fixed along the slide axis. In place of a friction wheel, a geared pinion wheel engages the fixed rack. Rotation of the pinion wheel causes translation along the slide axis. A belt and wheel system similarly provides a rotary input to linear travel arrangement. In a belt and wheel embodiment, the spot block assembly is attached to a belt system that runs along the slide axis. At a fixed position on the slide axis, such as an end or next to the blade, a belt driving wheel is mounted with an axis perpendicular to the slide axis. The belt is engaged to the wheel such that rotation of the fixed wheel results in linear travel of the belt along the slide axis as well as the spot block assembly which is fixed to the belt.

A threaded rod and nut system also converts rotational input into linear slide axis travel. In a threaded rod and nut embodiment, a threaded rod extending the length of the slide axis is translationally fixed parallel to the slide axis. The base member incorporates a female threaded feature such as a nut with the thread axis being parallel to the slide axis and co-linear to the threaded rod axis. The threaded rod and female threads of the nut are of the same size and pitch to achieve a functional thread fit. Rotation from an end of the threaded rod results in linear travel of the spot block assembly at a ratio dependent on the thread pitch. A cam-action adjustment mechanism functions more similarly to the screw type adjustment described above wherein the rotation of a cam with axis perpendicular to the slide axis results in a change in position along the slide axis of the guide assembly contact point relative to the base member.

Figure 6:
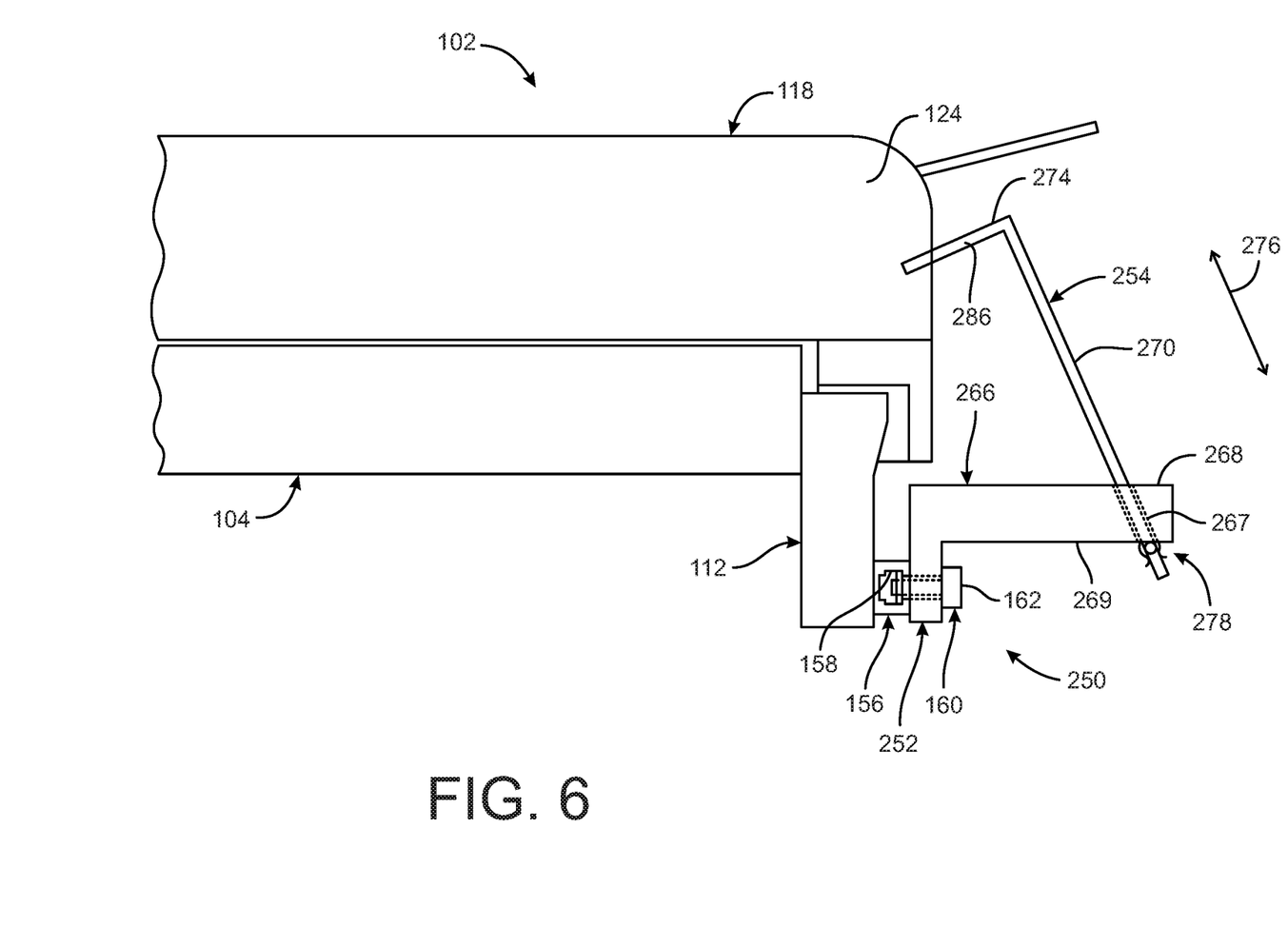
FIG. 6 is a side view of a table saw including a rip fence and a stop mechanism according to a second embodiment with the stop mechanism in a blocking position configured to set or record a position of the rip fence.
Figure 7:
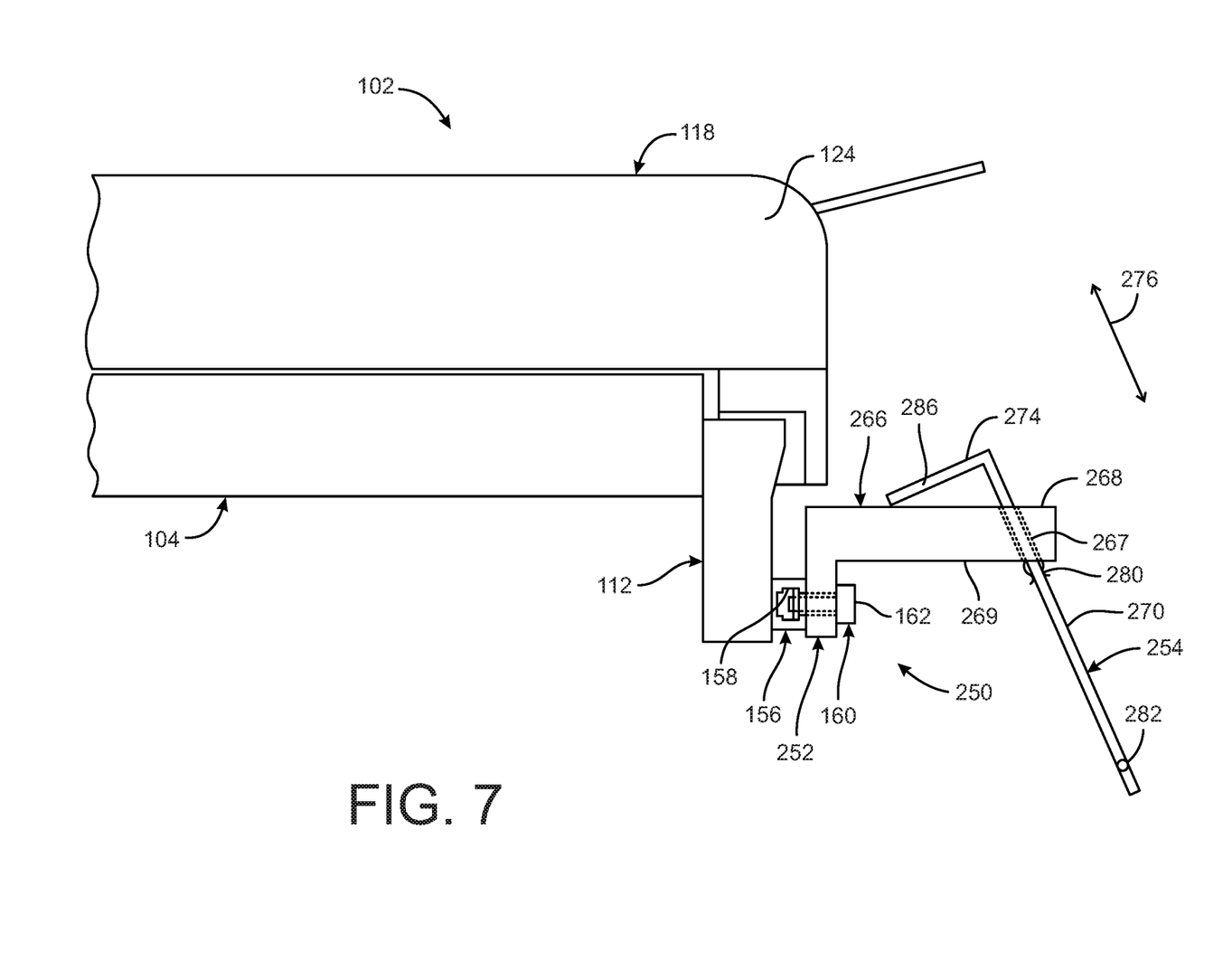
FIG. 7 is a side view of the stop mechanism of FIG. 6 in a bypass position.

FIGS. 6 and 7 illustrate a stop mechanism 250 according to a second embodiment. The stop mechanism 250 is described in connection with the table saw 100 and the guide assembly 102 of FIGS. 1-5 and like reference numerals are used to denote the same. The stop mechanism 250 includes a base member 252 and a blocking member 254 operatively connected to the base member 252. The base member 252 is configured to be connected to the second guide structure 156 on the rails 112, 114 of the table saw 100 in the same manner as the base member 152 of the stop mechanism 150 is connected to the second guide structure 156 so no further description of that connection is provided herein.

The stop mechanism 250 further includes the locking member 160 described above with reference to FIGS. 4 and 5. The locking member 160 cooperates with the base member 252 and the second guide structure 156 to connect the base member 252 to the second guide structure 156. The locking member 160 is operable to change a state of the base member 252 between an unlocked state and a locked state in the same manner as described above in connection with the operation of the locking member 160 on the base member 152 of the stop mechanism 150 so no further description of that operation is provided herein.

The base member 252 has a flange portion 266 that extends away from a surface of the base member 252 on which the fastener 162 of the locking member 160 cooperates. The flange portion 266 defines a slot 267 that extends entirely through the flange portion 266 between a top surface 268 and a bottom surface 269 of the flange portion 266. The slot 268 is configured to receive the blocking member 254.

The blocking member 254 has a main portion 270 and a blocking portion 274 disposed at an upper end of the main portion 270. The main portion 270 is configured to operatively connect the blocking member 254 to the base member 252. In the embodiment shown, the blocking member 254 has a plate-like thickness and a width that extends in the direction of the slide axis 117. The slot 267 in the flange portion 266 sized to accept the main portion 270 of the blocking member 254 and permits the blocking member 254 to translate relative to the base member 252 along a translation axis as illustrated by arrow 276. The blocking portion 274 extends transversely from the main portion 270. In the embodiment shown, the blocking portion 274 is angled at approximately 90 degrees relative to the main portion 270 although in different embodiments the blocking portion 274 is angled at greater or lesser than 90 degrees relative to the main portion 270.

The blocking member 254 is movable relative to the base member 252 between a blocking position (FIG. 6) in which at least a portion of the blocking portion 274 is positioned within the contact zone 126 and a bypass position (FIG. 7) in which the blocking member 254 is positioned entirely outside of the contact zone 126. In the blocking position depicted in FIG. 6, the transverse extension of the blocking portion 274 positions at least a portion of the blocking portion 274 within the contact zone 126 such that the alignment face 124 of the guide assembly 102 contacts the blocking portion 274 when the guide assembly 102 is moved across the table 104 on the rails 112, 114. The contact between the guide assembly 102 and the stop mechanism 250 when the blocking member 254 is in the blocking position enables the stop mechanism 250 to set and/or record the position of the guide assembly 102 on the table saw 100.

In the bypass position depicted in FIG. 7, the blocking member 254 is translated downwardly from the blocking position depicted in FIG. 6. The bypass position positions the blocking member 254 entirely outside of the contact zone 126 such that no portion of the guide assembly 102 contacts the blocking portion 274 or any other feature of the blocking member 254 when the guide assembly 102 is moved across the table 104 on the rails 112, 114. As illustrated in FIGS. 6 and 7, the slot 267 orients the main portion 270 of the blocking member 254 at an angle relative to a vertical direction that corresponds to the direction in which gravity acts on the table saw 100. The angle of the main portion 270 relative to the vertical direction in the embodiment shown is approximately 40 degrees though in different embodiments the angle can be greater or lesser than 40 degrees. The angle of the main portion 270 enables the blocking portion 274 to be moved out of the contact zone 126 by using only a translatory movement of the blocking member 254.

The stop mechanism 250 is configured such that the blocking member 254 remains in the blocking position once positioned therein until a user moves the blocking member 254 to the bypass position. The stop mechanism 250 is similarly configured such that the blocking member 254 remains in the bypass position once positioned therein until the user moves the blocking member 254 to the blocking position. In one embodiment, the base member 252 and the blocking member 254 are configured such that friction between the slot 267 and the main portion 270 is sufficient to hold the blocking member 254 in any position along its translation axis 276, yet a user is able to easily overcome said friction to reposition the blocking member 254. In another embodiment, the stop mechanism 250 can be configured such that the blocking member 254 remains in the bypass position by way of the force of gravity acting on the blocking member 254. In this embodiment, the downward translation of the blocking member 254 towards the bypass position stops when the blocking portion 274 contacts the flange portion 266 as shown in FIG. 7.

The stop mechanism 250 in the embodiment shown in FIGS. 6 and 7 includes a detent member 278 configured to hold the blocking member 254 in the blocking position when the blocking member 254 is positioned therein. The base member 252 in this embodiment includes a first detent portion 280 configured to engage a corresponding second detent portion 282 on the blocking member 254. The second detent portion 282 is releasable from the first detent portion 280 when the blocking member 254 is moved from the blocking position to the bypass position. When the blocking member 254 is positioned in the blocking position, the engagement between the first and second detent portions 280, 282 is configured to hold the blocking member 254 in the blocking position against the force of gravity acting on the blocking member 254. The detent member 278 is configured to release the blocking member 154 from the blocking position upon application of a predetermined releasing force on the blocking member 254.

The blocking member 254 defines a first planar reference surface (not shown) and a second planar reference surface 286 in the same manner as the first and second planar reference surfaces 184, 186 are defined by the blocking member 154 of the stop mechanism 150 of FIGS. 1-5. The orientation of the first and second reference surfaces 286 relative to the slide axis 117 is ensured in essentially the same manner as described in connection with the first and second reference surfaces 184, 186 of the stop mechanism 150. In at least one embodiment, at least two opposed surfaces of the slot 267 in the base member 252 guide the linear translation of the blocking member 254 and ensure the orientation of the first and second reference surfaces 286. The stop mechanism 250 can include one or both of an adjustment system 288 and an indicator 292, which are similar in structure and function to the adjustment system

188 and the indicator 192 described in connection with the stop mechanism 150 of FIGS. 1-5.

A stop mechanism in a further embodiment (not shown) can include combinations or modifications of the features described in connection with the stop mechanism 150 of FIGS. 1-5 and the stop mechanism 250 of FIGS. 6 and 7. For instance, the further stop mechanism in one embodiment can have a blocking member with a main portion and a blocking portion disposed at a first end of the main portion. The main portion is configured to translate in a vertical direction relative to a base member of the further stop mechanism. The blocking portion in this embodiment of the further stop mechanism is rotatable relative to the main portion so that after translation of the main portion in an upward vertical direction, the blocking portion can be rotated inwardly towards the table in order to penetrate the contact zone of the table and place the blocking member in the blocking position. In this manner, the blocking member of the further stop mechanism does not need to be spaced outwardly from table 104 as far as the blocking member 254 of the stop mechanism 250 is spaced from the table 104.

Figure 8:
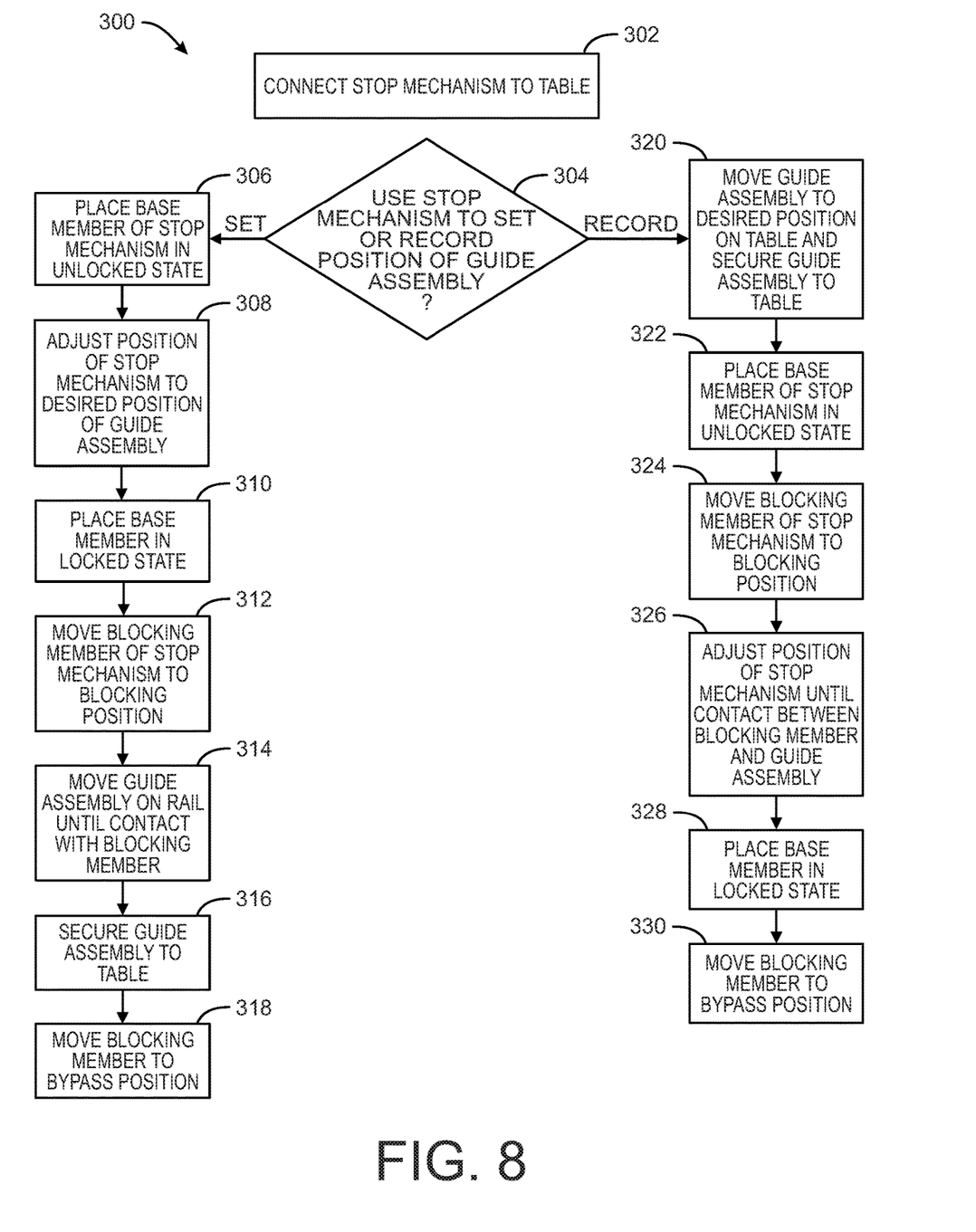
FIG. 8 illustrates a method of using a stop mechanism to set or record a position of a rip fence on a table saw.

FIG. 8 illustrates a method 300 for setting or recording a position of an accessory on a power saw. The method 300 is described in connection with the table saw 100 and the stop mechanisms 150, 250 described with reference to FIGS. 1-7. The accessory in a first application of the method 300 takes the form of the guide assembly 102 described with reference to FIGS. 1-7. The method 300 includes connecting at least one stop mechanism 150, 250 to the second guide structure 156 on the table 104 via the base member 152, 252 of the stop mechanism 150, 250 (block 302). The user then decides if the stop mechanism 150, 250 is to be used to set the position of the guide assembly 102 or to record the position of the guide assembly 102 (block 304).

If the stop mechanism 150, 250 is to be used to set the position of the guide assembly 102, the base member 152, 154 is placed in the unlocked state (block 306) and the stop mechanism 150, 250 is adjusted relative to the second guide structure 156 along the slide axis 117 until the position of the stop mechanism 150, 250 corresponds to a desired position of the guide assembly 102 (block 308). The user may reference the measurement scale 190 on the rail 112 and the indicator 192, 292 on the base member 152, 252 to verify the position of the stop mechanism 150, 250. The user may also utilize an adjustment system 188, 288 to finely adjust the position of the stop mechanism 150, 250.

Once the position of the stop mechanism 150, 250 corresponds to the desired position of the guide assembly 102, the user operates the locking member 160 to change the state of the base member 152, 252 from the unlocked state to the locked state (block 310). The blocking member 154, 254 is then moved from the bypass position to the blocking position if the blocking member 154, 254 is not already positioned therein (block 312). With the blocking member 154, 254 in the blocking position, the user moves the guide assembly 102 along the rails 112, 114 of the table 104 until the alignment face 124 of the guide assembly 102 contacts the corresponding reference surface 184, 186, 286 of the stop mechanism 150, 250 to set the position of the guide assembly 102 (block 314). The user then secures the guide assembly 102 to the table in a known manner (block 316).

The blocking member 154, 254 is then moved to the bypass position so that the user can make cuts with the table saw 100 (block 318). Since the base member 152, 252 is fixed in position relative to the second guide structure 156, the guide assembly 102 can be moved to other positions on the table and then returned to the desired position by again moving the blocking member 154, 254 to the blocking position (block 312) and again moving the guide assembly 102 along the rails 112, 114 until the alignment face 124 of the guide assembly 102 contacts the corresponding reference surface 184, 186, 286 of the stop mechanism 150, 250 (block 314).

As illustrated in FIG. 1, the stop mechanism 150 is positioned such that the first reference surface 184 of the blocking member 154 contacts the alignment face 124 that faces away from the blade to set the position of the guide assembly 102. In this position of the stop mechanism 150, the guide assembly 102 is moved away from the blade to set the position of the guide assembly 102. The stop mechanism 150 can also be positioned such that the second reference surface 186 of the blocking member 154 contacts the alignment face 124 that faces the blade to set the position of the guide assembly 102. In this position of the stop mechanism 150, the guide assembly 102 is moved towards the blade to set the position of the guide assembly 102. The stop mechanism 250 of FIGS. 6 and 7 can be positioned relative to the alignment faces 124 of the guide assembly 102 in the same manner as the stop mechanism 150 to set the position of the guide assembly 102.

If the stop mechanism 150, 250 is to be used to record the position of the guide assembly 102, the user first moves the guide assembly 102 along the rails 112, 114 of the table 104 to a desired position of the guide assembly 102 and secures the guide assembly 102 to the table 104 in that desired position (block 320). The base member 152, 252 is placed in the unlocked state (block 322) and the blocking member 154, 254 is moved to the blocking position (block 324). The stop mechanism 150, 250 is then adjusted relative to the second guide structure 156 along the slide axis 117 until the corresponding reference surface 184, 186, 286 of the stop mechanism 150, 250 contacts the alignment face 124 of the guide assembly 102 (block 326). The user then operates the locking member 160 to change the state of the base member 152, 252 from the unlocked state to the locked state to record the position of the guide assembly 102 (block 328). The blocking member 154, 254 is then moved to the bypass position so that the user can make cuts with the table saw 100 (block 330).

The table saw 100 is configured to accommodate a plurality of the stop mechanisms 150, 250 so that a single user can use respective stop mechanisms to set or record respective multiple positions for the guide assembly 102. Similarly, multiple users can use the plurality of stop mechanisms 150, 250 to set or record multiple positions for the guide assembly 102 on the table.

In another application of the method 300, the accessory is a work piece to be cross cut by the table saw 100 without the use of the guide assembly 102. For making repetitive cross cuts, a user typically clamps a block to the front of the guide assembly 102 to act as a reference surface. The use of a block on the guide assembly 102 allows for positioning of the workpiece without the danger of trapping the cut off portion of the workpiece between the blade and guide assembly 102 as would occur without the block. When a block is used, the user needs to account for the thickness of the block on the measurement scale. The stop mechanism 150, 250 permits repetitive cross cuts without the need to use the guide assembly 102. The blocking member 154, 254 of the stop mechanism 150, 250, when in the blocking position, effectively functions as the positioning block to align the workpiece before the start of the cross cut. The use of the stop mechanism 150, 250 in this way enables cross cuts to benefit from an integrated measuring scale, an adjustment system, and the use of the full rail capacity.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A power saw assembly, comprising:
a blade defining a plane;
a table having a support surface and a periphery that bounds the support surface, the support surface having an opening configured to receive the blade;
a guide structure fixed on a portion of the periphery of the table, the guide structure defining a slide axis that extends parallel to the support surface and is oriented perpendicular to the;
a fence assembly configured to be releasably connected to the guide structure, the fence assembly having a body that traverses the support surface and is movably guided via the guide structure along the slide axis so as to define a contact zone; and
a stop mechanism configured to selectively block a movement of the fence assembly within the contact zone, the stop mechanism having a base member and a blocking member connected to the base member,
wherein the base member is configured to be connected to the guide structure in (i) an unlocked state in which the base member is infinitely adjustably relative to the guide structure along the slide axis and (ii) a locked state in which the base member is fixed relative to the guide structure, the base member disposed outside of the contact zone in both the unlocked state and the locked state, and
wherein, when the base member is in the locked state at a fixed position, the blocking member is moveable relative to the base member between (i) a blocking position in which a portion of the blocking member is positioned within the contact zone such that the blocking member is configured to block the fence assembly and (ii) a bypass position in which the blocking member is positioned outside of the contact zone such that no portion of the stop mechanism is configured to block the fence assembly over the total range of travel of the fence assembly on the table.

2. The power saw assembly of claim 1, wherein the blocking member rotates between the blocking position and the bypass position.

3. The power saw assembly of claim 2, wherein the blocking member rotates about a pivot formed on the base member.

4. The power saw assembly of claim 1, wherein the blocking member translates between the blocking position and the bypass position.

5. The power saw assembly of claim 4, wherein the base member has at least two opposed guide surfaces that guide a linear translation of the blocking member.

6. The power saw assembly of claim 4, wherein the blocking member is configured to translate along a translation axis oriented transversely with respect to the support surface.

7. The power saw assembly of claim 1, wherein the stop mechanism includes a detent member that holds the blocking member in the blocking position.

8. The power saw assembly of claim 7, wherein the detent member includes a first detent portion disposed on the base member and a second detent portion disposed on the blocking member, the second detent portion engaging the first detent portion when the blocking member is in the blocking position.

9. The power saw assembly of claim 1, wherein the stop mechanism includes a biasing member configured to bias the blocking member relative to the base member in one direction along the slide axis.

10. The power saw assembly of claim 1, wherein the stop mechanism includes a biasing member configured to bias the blocking member in the bypass position.

11. The power saw assembly of claim 1, wherein the stop mechanism is configured such that gravity biases the blocking member in the bypass position.

12. The power saw assembly of claim 1, wherein the blocking member has a main portion connected to the base member and a blocking portion that extends transversely from the main portion, the blocking portion defining a planar reference surface oriented normal to the slide axis and configured to contact a coplanar surface of the fence assembly.

13. The power saw assembly of claim 1, wherein the guide structure defines a path, the base member (i) guided along the path when moved relative to the guide structure in the unlocked state and (ii) fixed in the path when in the locked state.

14. The power saw assembly of claim 1, wherein the guide structure is one of formed integrally in the table or separately attached to the table.

15. The power saw assembly of claim 1, wherein:
the guide structure defines a slot that extends parallel to the slide axis, and
the stop mechanism further includes a locking member that is operable to connect the base member to the slot in the unlocked state and the locked state.

16. The power saw assembly of claim 1, wherein the stop mechanism includes an adjustment system configured to finely adjust a position of the stop mechanism relative to the guide structure.

17. A method for setting or recording a position of a guide assembly on a power saw assembly, the power saw assembly including a blade, a table with an opening configured to receive the blade, and a guide structure on the table, the method comprising:
connecting a stop mechanism to the guide structure via a base member configured to be (i) infinitely adjustable relative to the guide structure in an unlocked state and (ii) fixed relative to the guide structure in a locked state, the base member connected to the guide structure and spaced from the guide assembly in both the unlocked state and the locked state; and
adjusting a position of the stop mechanism or the guide assembly until contact occurs between a blocking member of the stop mechanism and the guide assembly, the blocking member connected to the base member and moveable between a blocking position and a bypass position while the base member is in the locked state at a fixed position on the guide structure,
wherein (i) the blocking member in the blocking position is configured to contact an alignment face of the guide assembly and (ii) the blocking member in the bypass position is spaced from the guide assembly and no portion of the stop mechanism is configured to contact the guide assembly for every position of the guide assembly on the table.

18. The method of claim 17, wherein setting a position of the guide assembly further includes:
- adjusting the position of the base member to correspond to a desired position for the guide assembly on the table;
- placing the base member in the locked state;
- moving the guide assembly into contact with the blocking member with the blocking member in the blocking position; and
- securing the guide assembly to the table.

19. The method of claim 17, wherein recording a position of guide assembly further includes:
- securing the guide assembly to the table;
- moving the stop mechanism relative to the guide structure until the blocking member in the blocking position contacts the guide assembly; and
- placing the base member in the locked state.

* * * * *

UNITED STATES PATENT AND TRADEMARK OFFICE
CERTIFICATE OF CORRECTION

PATENT NO. : 10,703,007 B2  
APPLICATION NO. : 15/946832  
DATED : July 7, 2020  
INVENTOR(S) : William J. Shiel It is certified that error appears in the above-identified patent and that said Letters Patent is hereby corrected as shown below:

In the Claims

In Claim 1, at Column 13, Line 20: "perpendicular to the;" should read --perpendicular to the plane of the blade;--.

Signed and Sealed this
Fifteenth Day of December, 2020

Andrei Iancu
*Director of the United States Patent and Trademark Office*